US012634136B2

(12) United States Patent
Prest et al.

(10) Patent No.: US 12,634,136 B2
(45) Date of Patent: May 19, 2026

(54) SHARING CRYPTOGRAPHIC MATERIAL

(71) Applicant: PQShield Ltd, Oxford (GB)

(72) Inventors: Thomas Prest, Oxford (GB); Shuichi Katsumata, Oxford (GB)

(73) Assignee: PQShield Ltd., Oxford (GB)

( * ) Notice: Subject to any disclaimer, the term of this patent is extended or adjusted under 35 U.S.C. 154(b) by 264 days.

(21) Appl. No.: 18/482,537

(22) Filed: Oct. 6, 2023

(65) Prior Publication Data

US 2024/0048385 A1 Feb. 8, 2024

Related U.S. Application Data

(63) Continuation of application No. PCT/GB2022/050873, filed on Apr. 7, 2022.

(30) Foreign Application Priority Data

Apr. 16, 2021 (GB) ..................................... 2105459

(51) Int. Cl.
H04L 9/40 (2022.01)
H04L 9/32 (2006.01)

(52) U.S. Cl.
CPC .......... H04L 9/3213 (2013.01); H04L 9/3247 (2013.01)

(58) Field of Classification Search
CPC ............................. H04L 9/3213; H04L 9/3247
See application file for complete search history.

(56) References Cited

U.S. PATENT DOCUMENTS

| | | | | |
|---|---|---|---|---|
| 9,912,479 | B1 * | 3/2018 | Yamada | .................. H04L 9/002 |
| 10,116,440 | B1 * | 10/2018 | Rudzitis | ............... H04L 9/0891 |
| 10,404,458 | B1 * | 9/2019 | Yamada | ............... H04L 9/0852 |
| 11,153,080 | B1 * | 10/2021 | Nix | ........................ H04L 9/3093 |
| 11,995,194 | B1 * | 5/2024 | Shea | ..................... H04L 9/0852 |

(Continued)

OTHER PUBLICATIONS

Shuichi Katsumata et al: "Scalable Ciphertext Compression Techniques for Post-Quantum KEMs and their Applications", pp. 1-41 URL: http://eprint.iacr.org/2020/1107.pdf Sep. 14, 2020.

(Continued)

*Primary Examiner* — Ghodrat Jamshidi
(74) *Attorney, Agent, or Firm* — EIP US LLP

(57) ABSTRACT

A method includes, at a first communications device: processing encapsulation keys of a plurality of second communications devices using an encapsulation function to generate a symmetric key, an authenticable token, and a ciphertext; and transmitting, to each of the second communications devices, the token and a respective portion of the ciphertext depending on the respective encapsulation key of that second communications device. The token is a cryptographic commitment of the symmetric key, and the ciphertext is a multi-recipient encapsulation of the symmetric key under the encapsulation keys of the second communications devices. The method further includes, at each second communications device: processing the respective decapsulation key and the respective portion of the ciphertext using a decapsulation function to generate a respective candidate copy of the symmetric key; authenticating the token, whereby to determine that the respective candidate copy of the symmetric key corresponds to the symmetric key.

20 Claims, 4 Drawing Sheets

(56) References Cited

U.S. PATENT DOCUMENTS

| 2008/0288403 A1* | 11/2008 | von Mueller .......... | G06Q 20/40 |
| | | | 705/44 |
| 2011/0252146 A1* | 10/2011 | Santamaria ......... | H04L 65/1083 |
| | | | 709/227 |
| 2015/0106618 A1* | 4/2015 | Nair .................... | H04L 63/0823 |
| | | | 713/156 |
| 2018/0007025 A1* | 1/2018 | Oberheide ................ | H04L 9/14 |
| 2020/0259647 A1* | 8/2020 | Goncalves ............ | H04L 9/3093 |
| 2020/0280436 A1* | 9/2020 | Nix ....................... | H04L 9/0869 |
| 2020/0287715 A1* | 9/2020 | Wang ................... | H04L 9/0866 |
| 2021/0099290 A1* | 4/2021 | Tomlinson ................ | H04L 9/14 |
| 2022/0123929 A1* | 4/2022 | Johnson ................ | H04L 9/0863 |
| 2022/0166602 A1* | 5/2022 | Wu ....................... | H04L 9/0643 |

OTHER PUBLICATIONS

Karthikeyan Bhargavan et al: "Formal Models and Verified Protocols for Group Messaging: Attacks and Proofs for IETF MLS" HAL Id: hal-02425229, Dec. 9, 2020.

Alwen J et al: "On The Insider Security of MLS", IACR ePrint, vol. 20201023:084942 Oct. 22, 2020, pp. 1-50, XP061041590 http://eprint.iacr.org/2020/1327.pdf.

Combined Search and Examination Report dated Dec. 23, 2021 for GB Application No. GB2105459.8.

International Search Report and Written Opinion dated Jul. 26, 2022 for PCT Application No. PCT/GB2022/050873.

\* cited by examiner

SHARING CRYPTOGRAPHIC MATERIAL

CROSS-REFERENCE TO RELATED APPLICATIONS

This application is a continuation under 35 U.S.C. § 120 of International Application No. PCT/GB2022/050873, filed Apr. 7, 2022 which claims priority to GB Application No. GB2105459.8 filed Apr. 16, 2021, under 35 U.S.C. § 119(a). Each of the above-referenced patent applications is incorporated by reference in its entirety.

BACKGROUND

Technical Field

The present invention relates to secure group messaging (SGM) between communications devices. The invention has particular, but not exclusive, relevance to SGM under post-quantum assumptions.

Background

Instant messaging applications have become ubiquitous in recent years. Many of these applications, such as WhatsApp® and Signal®, offer end-to-end encrypted messaging with security guarantees derived from various secure (group) messaging protocols. The Internet Engineering Task Force® (LEFT) has drafted various proposals for standardising such protocols. Secure messaging protocols can be assessed in terms of the security guarantees they provide, and also their efficiency in terms of computational resources and/or bandwidth.

At a protocol level, a secure conversation between two or more parties involves an initial "handshake" in which the parties agree on a shared symmetric key for use in exchanging encrypted messages, and an ongoing continuous group key agreement (CGKA) in which the parties are able to update the shared symmetric key and add or remove a participant from the conversation. The handshake may be implemented independently of the CGKA or may be handled as part of the CGKA. The CGKA typically makes use of a key encapsulation mechanism (KEM) in which symmetric cryptographic keys are generated and securely exchanged by means of ciphertexts transmitted between the devices. For improved security, the shared keys may be updated frequently during the CGKA, and in particular when one of the parties believes the shared keys may be compromised, thereby providing post-compromise security (PCS).

For instant messaging applications, both the messaging and the CGKA are asynchronous, requiring information to be transmitted between devices even when the receiving devices are offline when the information is sent. In order to achieve this, servers are typically utilised in addition to the communications devices involved in the messaging. In some security protocols, a passive server is provided to act as a bulletin board such that a data package uploaded by one of the devices in a group is simply forwarded to the other devices in the group (for example as shown in FIG. 1, in which the upload package "up" uploaded to a server 100 by a first communications device 101 is forwarded to each of a set of second security devices 102*a-e*). In other security protocols, an active server is provided which is able to process uploaded data packages enable respective different packages to be downloaded by the devices in the group (for example as shown in FIG. 2, in which the upload package "up" uploaded to a server 200 by a first communications device 201 is processed by the server 200 and a different download package "dp" is forwarded to each of a set of second communications devices 202*a-e*).

In the case of an active server, if the data size of each download package can be made much smaller than the data size of the upload package, for example by removing unnecessary parts of the upload package, then the bandwidth efficiency of the protocol can in principle be improved. In the case of a CGKA, transmitting respective different portions of a ciphertext to the different devices can in principle be used to improve the bandwidth efficiency, for example in accordance with a multi-recipient key encapsulation mechanism (mKEM). However, this improved bandwidth efficiency is mitigated if the receiving devices are required to authenticate the received portions of the ciphertext, because different authentication data (e.g. digital signatures) needs to be generated for the different receiving devices, and uploaded to the server by the sending device. For large numbers of devices (for example hundreds or thousands of devices), such a solution is not scalable. If the CGKA is required to be secure under post-quantum assumptions, the byte sizes of the ciphertexts used to encapsulate the symmetric keys and the resulting digital signatures can be significantly greater, further adding to the bandwidth cost of the CGKA.

CGKA methods based on a protocol referred to as TreeKEM have been developed and are included in the LEFT draft proposals. In such methods, decapsulation keys are exchanged between devices according to a tree data structure, typically resulting in improved scalability for uploaded data (with the bandwidth cost growing logarithmically rather than linearly with the number of devices). However, this improvement is at least partially offset by reduced scalability for downloaded data.

SUMMARY

According to a first aspect of the present disclosure, there is provided a method of sharing a symmetric cryptographic key between a first communications device and a plurality of second communications devices. Each of the second communications devices is associated with a respective public-private keypair in which a respective decapsulation key is held at the second communications device and a respective encapsulation key is accessible by the first communications device. The method includes, at the first communications device: processing the encapsulation keys of the plurality of second communications devices using an encapsulation function to generate the symmetric cryptographic key, an authenticable token, and a ciphertext; and transmitting, to each of the plurality of second communications devices, the token and a respective portion of the ciphertext depending on the respective encapsulation key of that second communications device. The token is a cryptographic commitment of the symmetric cryptographic key, and the ciphertext is a multi-recipient encapsulation of the symmetric cryptographic key under the encapsulation keys of the plurality of second communications devices. The method further includes, at each of the plurality of second communications devices: processing the respective decapsulation key and the respective portion of the ciphertext using a decapsulation function associated with said encapsulation function, to generate a respective candidate copy of the symmetric cryptographic key; and authenticating the token, whereby to determine that the respective candidate copy of the symmetric cryptographic key corresponds to the symmetric cryptographic key.

Transmitting respective different portions of the ciphertext to the second communications devices allows for a reduced volume of data to be transmitted during the sharing of the symmetric cryptographic key, compared with transmitting the full ciphertext to each second communications device. Further transmitting the same authenticable token to each second communications device provides a computationally- and bandwidth-efficient means for the second communications devices to detect if the received portion of the ciphertext has been tampered with, and to determine whether the received portion of the ciphertext originated from the first communications device. For example, the decapsulation function may be arranged to output an error, set a flag, generate an alert, or exhibit any other suitable form of detectable behaviour if the token is not consistent with the received portion of the ciphertext.

The token can be chosen to reveal no additional information about the symmetric cryptographic key. For example, the generated ciphertext may further include a common portion independent of any of the encapsulation keys of the plurality of second communications devices, in which case the token may be said common portion of the generated ciphertext. In such an example, the bandwidth requirements are not increased by the provision of the token, because the common portion of the generated ciphertext is required in any case for decapsulating the symmetric cryptographic key. In another example, the token is a digital signature of data derived from the symmetric key.

In examples, the method further includes, at the first communications device: processing data derived from the token using a secret key to generate authentication data for use in authenticating the token; and transmitting said authentication data to each of the plurality of second communications devices, wherein said authenticating of the token uses the authentication data. The authentication data may for example be a digital signature or a message authentication code (MAC). By generating the authentication data in dependence on the token, the same authentication data can be provided to all the second communications devices, whilst still allowing different portions of the ciphertext to be sent to each second communications device. By contrast, if the authentication data is generated in dependence on the different portions of the ciphertext, then different authentication data needs to be generated for each of the second communications devices. The use of the token thereby reduces processing demands at the first communications device, and in the case that data is transmitted via a server, reduces the volume of data that the first communications device needs to upload to the server, thereby improving bandwidth efficiency and scalability.

In some examples in which authentication data is used, the method further includes, at the first device: generating a first public-private keypair comprising a first decapsulation key and an associated first encapsulation key; and providing the first encapsulation key to each of the plurality of second communications devices. The data processed to generate the authentication data may then further be dependent on the first encapsulation key, for example being a concatenation of the token and the first encapsulation key. In this way, the first communications device is able to provide the newly generated encapsulation key to each of the second communications devices, without increasing the bandwidth cost of sending the authentication data beyond what is already needed to authenticate the token.

The encapsulation function and the decapsulation function may respectively be instantiated using supersingular isogeny key encapsulation (SIKE) or the Lindner-Peikert framework. By using an encapsulation scheme based on one of these frameworks, along with a post-quantum secure authentication method for the token, the sharing of a symmetric cryptographic key is secure even under post-quantum assumptions. Ciphertexts generated under such assumptions typically have a significantly greater byte size than ciphertexts generated under pre-quantum assumptions, and in examples where a signature scheme is used for authenticating the token, the resulting signatures also have a significantly greater byte size. The provision of the authenticable token may therefore result in particularly high bandwidth savings in such scenarios.

The symmetric cryptographic key may be used to enable encrypted messaging. The symmetric cryptographic key may for example be used directly to encrypt messages between the communications devices, or may be used along with other data such as a prior messaging key to generate a new messaging key for encrypting messages between the communications devices.

According to a second aspect of the present disclosure, there is provided a system comprising a server and a plurality of communications devices including a first communications device and a plurality of second communications devices, wherein each of the second communications devices is associated with a respective public-private keypair in which a respective decapsulation key is held at the second communications device and a respective encapsulation key is accessible by the first communications device. The first communications device is arranged to: process the encapsulation keys of the plurality of second communications devices using an encapsulation function to generate the symmetric cryptographic key, an authenticable token, and a ciphertext; and upload the token and the ciphertext to the server. The token is a cryptographic commitment of the symmetric cryptographic key, and the ciphertext is a multi-recipient encapsulation of the symmetric cryptographic key under the encapsulation keys and comprises a respective portion depending on the respective encapsulation key of each of the plurality of second communications devices. Each of the plurality of second communications devices is arranged to: download the token and the respective portion of the ciphertext for that second communications device from the server; process the respective decapsulation key and the respective portion of the ciphertext, using a decapsulation function associated with said encapsulation function, to generate a respective candidate copy of the symmetric cryptographic key; and authenticate the token, whereby to determine that the respective candidate copy of the symmetric cryptographic key corresponds to the symmetric cryptographic key.

The server may be arranged to authenticate the token using the authentication data, in which case the downloading of the token and the respective portion of the ciphertext from the server can be made dependent on the authentication of the token. In this way, the server prevents wasteful use of resources in transmitting corrupted or compromised data to the second communications devices. Furthermore, the provision of the token and authentication data provides implicit authentication of the first communications device, allowing the system to forego further authentication of the first communications device by the server or any of the second communications devices.

The second communications devices may be arranged to query the server for cryptographic material associated with the other communications devices of in then group. In this way, when a given communications device connects to the server, that communications device can download updated symmetric cryptographic keys generated by any of the other communications devices since the last time the given communications device connected to the server. The given communications device may for example hold a respective prior cryptographic key, and be arranged to process the respective prior symmetric cryptographic key along with the updated a symmetric cryptographic key, using a key generation function, to generate an updated cryptographic key for use in encrypting messages to the other communications devices.

Further features and advantages of the invention will become apparent from the following description of preferred embodiments of the invention, given by way of example only, which is made with reference to the accompanying drawings.

DETAILED DESCRIPTION

Figure 1:
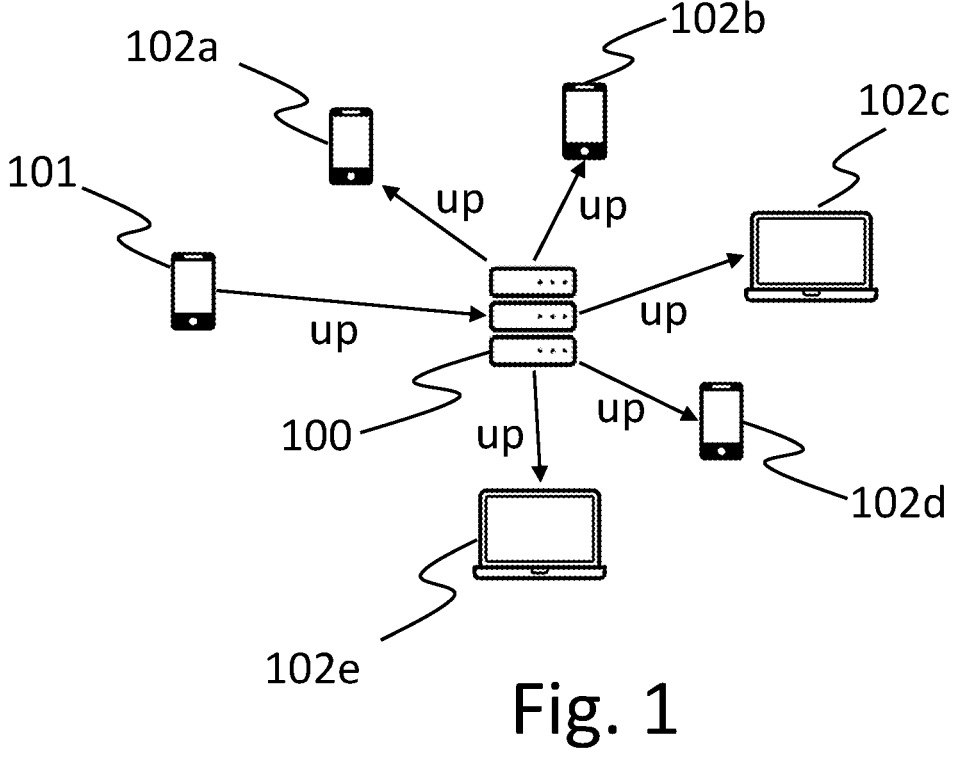
FIG. 1 shows schematically a first example of a system for sharing a symmetric cryptographic key between a group of communications devices.

Examples described herein relate to the sharing of symmetric cryptographic keys between a group of communications devices. In the present disclosure, a communications device can be any electronic device via capable of sending and/or receiving digital messages received from a user via a user interface. In particular, a communications device may support one or more instant messaging applications, allowing for secure asynchronous messaging between groups of one or more devices. Examples of communications devices include mobile communications devices such as smartphones, laptop computers and tablet computers, as well as fixed communications devices such as desktop computers. A group of communications devices may exchange data with one another directly or indirectly, using wired and/or wireless means, for example via a network including a core network and a radio access network.

Certain examples herein relate to CGKA protocols for enabling secure group messaging between a group of communications devices. In particular, the present disclosure provides a novel CGKA based on an augmented mKEM to achieve improved scalability compared with existing CGKAs. The mKEM proposed herein utilises three cryptographic functions: a key generation function; a novel (multi-recipient) encapsulation function; and a novel decapsulation function associated with the encapsulation function.

The key generation function Keygen is arranged to (pseudo-)randomly generate an ephemeral public-private keypair comprising a public encapsulation key $ek_i$ and a private decapsulation key $dk_i$, where the index i indicates a party with which the keypair is associated.

The encapsulation function tmEncaps is arranged to process a set S of encapsulation keys $(ek_j)_{j \in S}$ to generate a symmetric cryptographic key k, an authenticable token tok which is a cryptographic commitment of the symmetric key k, and a multi-recipient ciphertext $\vec{ct}$ which is a multi-recipient encapsulation of the symmetric cryptographic key under the set of encapsulation keys $(ek_j)_{j \in S}$. The ciphertext $\vec{ct}$ includes a respective portion $\widehat{ct}_j$ dependent on each of the encapsulation keys $ek_j$, and a common portion $ct_0$ which is independent of any of the encapsulation keys, such that $\vec{ct} = (ct_0, (\widehat{ct}_j)_{j \in S})$. For certain instantiations of the encapsulation function, the common portion $ct_0$ may be absent, or equivalently may have a byte size of zero.

The decapsulation function tDecaps is arranged to process a respective portion $\widehat{ct}_j$ of the ciphertext and the token tok, using the decapsulation key $dk_j$ associated with the encapsulation key $ek_j$, to output a candidate copy k* of the symmetric cryptographic key k. The decapsulation function is arranged to output an error, or exhibit some other form of detectable behaviour, if the token is not consistent with the respective portion of the ciphertext.

As mentioned above, the token is a cryptographic commitment of the symmetric cryptographic key k, allowing any party to check whether a candidate key k* is identical to k, without revealing the identity of k to a party without access to k. The token is chosen such that, given the output of a legitimate encapsulation $(k, \vec{ct}, tok) \leftarrow tmEncaps((ek_j)_{j \in S})$, it is difficult to produce a $(ct*_0, \widehat{ct}_j^*)$ that differs from the corresponding portion of a, such that $tDecaps(dk_j, (ct*_0, \widehat{ct}_j^*), tok)$ does not output an error symbol 1 or other detectable output. In other words, the decapsulation function may be arranged to output an error if the token is not consistent with the received portion of the ciphertext. It is therefore difficult for an attacker to tamper with the ciphertext without the tampering being detected by the token. The token should be chosen such that, given $((ct_0, \widehat{ct}_j), tok)$, it is difficult to recover the symmetric key k without the associated decapsulation key $dk_j$. Ideally, the token should provide no additional information about the symmetric key k that is not available to an attacker already in possession of $(ct_0, \widehat{ct}_j)$.

In order for the token to be useful for detecting tampering of the ciphertext, the token must be authenticable. In other words, the token is associated with means by which a device receiving the token can verify that the token originated from the claimed sender and has not been tampered with during transmission from the sender. If the token is not authenticable, an attacker may be able to modify the token in a way that is consistent with the tampering (for example if the attacker gains control of a server used in the transmission of data), thereby avoiding the tampering being detected. In some examples, data derived from the token is processed using a secret key to generate authentication data, and this authentication data is transmitted to each of the receiving devices for use in authenticating the token. In some examples, the secret key is a signature key $sk_i$ associated with a public verification key $vk_i$, and the authentication data is in the form of a digital signature. Authenticating the token then involves verifying the digital signature using a public verification key associated with the signature key. In other examples, the secret key is shared between the sending device and each of the receiving devices, and the authentication data is in the form of a message authentication code (MAC). Authenticating the token then involves verifying the message authentication code using the shared secret key. In either of these cases, the authentication data is generated based on data derived from the token, which may include the token itself and/or a cryptographic hash or other function of the token, possibly concatenated with, or processed together with, other data which is independent of the token. In another example, the token is itself a digital signature of data derived from the symmetric key k (for example, a pseudo-random function (PRF) of the symmetric cryptographic key) using the signature key $sk_i$, in which case authenticating the token comprises generating a candidate copy k* of the symmetric key k and verifying the signature using the candidate copy k* and the verification key $vk_i$. In this case, no additional signature is required to be transmitted and the decapsulation function can be made independent of the token.

A range of other authentication methods are known in the art, some of which may not involve transmitting authentication data from the sending device to the receiving devices. One alternative means by which a token may be authenticable is if the token and the portion of the ciphertext are provided to the receiving device using different transmission means. For example, the token may be transmitted via a different server to the ciphertext. Additionally, or alternatively, the token and the ciphertext may be transmitted using different radio access technologies. A token transmitted via a different means to the ciphertext is implicitly authenticated upon receipt by the receiving device, based on the assumption that it is difficult for an attacker to gain control over both transmission means. The underlying principle of such an authentication method is similar to that of two-factor authentication. Alternatively, or additionally, the token may be downloaded from a trusted source providing its own authentication means, for example using a trusted execution environment. By contrast, a token transmitted by the same means as the ciphertext, without authentication data, and not from a trusted source providing its own authentication means, is not considered to be authenticable.

The token may be generated as a function of the symmetric key k and/or the common portion $ct_0$ of the ciphertext $\vec{ct}$, for example a cryptographic hash function. This enables the modified encapsulation function to be implemented by augmenting a standard multi-recipient encapsulation function (which is arranged to generate a symmetric key and a multi-recipient ciphertext), allowing any such standard function to be used as a black box, as shown by the pseudocode below:

| tmEncaps(($ek_j)_{j \in S}$) |
|---|
| 1. (k, $ct_0$, ($\hat{ct}_j)_{j \in S}$) ← mEncaps(($ek_j)_{j \in S}$) |
| 2. tok ← F(k, $ct_0$) |
| 3. return (k, $ct_0$, ($\hat{ct}_j)_{j \in S}$, tok) | in which F is a deterministic function such as a PRF. Advantageously, choosing the token to be a function of the common portion $ct_0$ provides no additional information about the symmetric key k that is not available to an attacker in possession of ($ct_0, \hat{ct}_j$). In one example, the token is given by the common portion of the ciphertext such that tok=$ct_0$, which is particularly advantageous as in this case transmitting the token results in no additional bandwidth cost, since the common portion $ct_0$ already needs to be transmitted for decapsulation of the symmetric key. An example of an encapsulation function suitable for the black box approach is based on a decomposable IND-CPA (indistinguishably under chosen-plaintext attack) multi-recipient public key encryption (mPKE) scheme as shown by the pseudocode below:

| mEncaps(($ek_j)_{j \in S}$) |
|---|
| 1. | generate a random M |
| 2. | $ct_0$ ← $Enc^{ind}$ ($G_1$ (M)) |
| 3. | for j ∈ S do: |
| | $\hat{ct}_j$ ← $Enc^{dep}$ ($ek_j$, M, $G_1$(M), $G_2$($ek_j$, M)) |
| | end for; |
| 4. | k ← H(M) |
| 5. | return (k, $\vec{ct}$ = ($ct_0$, ( $\hat{ct}_j$ )$_{j \in S}$)) | in which $G_1$ and $G_2$ are PRFs, H is a cryptographic hash function, and $Enc^{ind}$ and $Enc^{dep}$ are components of a decomposable mPKE function Enc that are respectively independent and dependent on the encapsulation key. A corresponding decapsulation function tDecaps is given by the pseudocode below:

| tDecaps($dk_j$, ($ct_0$, $\hat{ct}_j$), tok) |
|---|
| 1. M ← Dec($dk_j$, ($ct_0$, $\hat{ct}_j$)) |
| 2. if M = ⊥, return k := ⊥ |
| 3. k ← H(M) |
| 4. tok' ← F(k, $ct_0$) |
| 5. if tok' ≠ tok, return k := ⊥ |
| 6. return k | in which Dec is a decryption function associated with the decomposable encryption function Enc used in mEncaps. The decapsulation algorithm may include additional steps, for example reconstructing the relevant ciphertext portion from M using the encapsulation key $ek_j$ and checking for consistency with the received ciphertext portion.

As an alternative to the black box approach described above, the token may be generated alongside the symmetric key k, for example with the symmetric key and the token being separate portions of an output of a common function. An example of a modified encapsulation function may for example be implemented using the pseudocode below:

| mEncaps(($ek_j)_{j \in S}$) |
|---|
| 1. | generate a random M |
| 2. | $ct_0$ ← $Enc^{ind}$ ($G_1$(M)) |
| 3. | for j ∈ S do: |
| | $\hat{ct}_j$ ← $Enc^{dep}$ ($ek_j$, M, $G_1$(M), $G_2$($ek_j$, M)) |
| | end for; |
| 4. | (k, tok) ← H'(M) |
| 5. | return (k, tok, $\vec{ct}$ = ($ct_0$, ( $\hat{ct}_j$ )$_{j \in S}$)) | in which H' is a cryptographic hash function with an extended output compared with the function H in the example mEncaps algorithm above. A corresponding decapsulation function is given by the pseudocode below:

| tDecaps($dk_j$, ($ct_0, \hat{ct}_j$ ), tok) |
|---|
| 1. M ← Dec($dk_j$, ($ct_0, \hat{ct}_j$ )) |
| 2. if M = ⊥, return k := ⊥ |
| 3. (k, tok') ← H'(M) |

-continued $$\text{tDecaps}(dk_j, (ct_0, \tilde{ct}_j), \text{tok})$$

4. if tok' $\neq$ tok, return k := $\perp$
5. return k

An mKEM based on the tmEncaps and tDecaps algorithms given above is IND-CCA (indistinguishable under chosen ciphertext attack). Advantageously, instantiating these algorithms using the Lindner-Peikert framework or SIKE can result in security guarantees under post-quantum assumptions. The Lindner-Peikert framework encompasses a number of proposed KEMs which are candidates for round 3 of the National Institute of Standards and Technology (NIST) Post-Quantum Cryptography Competition, including CRYSTALS-CYBER, SABER, FrodoKEM, NTRU, and NTRU Prime. Other post-quantum secure KEMs include code-based methods such as Classic McEliece, BIKE, and HQC.

In order for the mKEM to be truly secure under post-quantum assumptions, it is also necessary for the authentication method to be post-quantum secure. Examples of signature schemes that are post-quantum secure include FALCON, CRYSTALS-DILITHIUM, SPHINCS+ and Rainbow, all of which are candidates for round 3 of the NIST Post-Quantum Cryptography Competition, though other post-quantum secure signature schemes are available.

Figure 2:
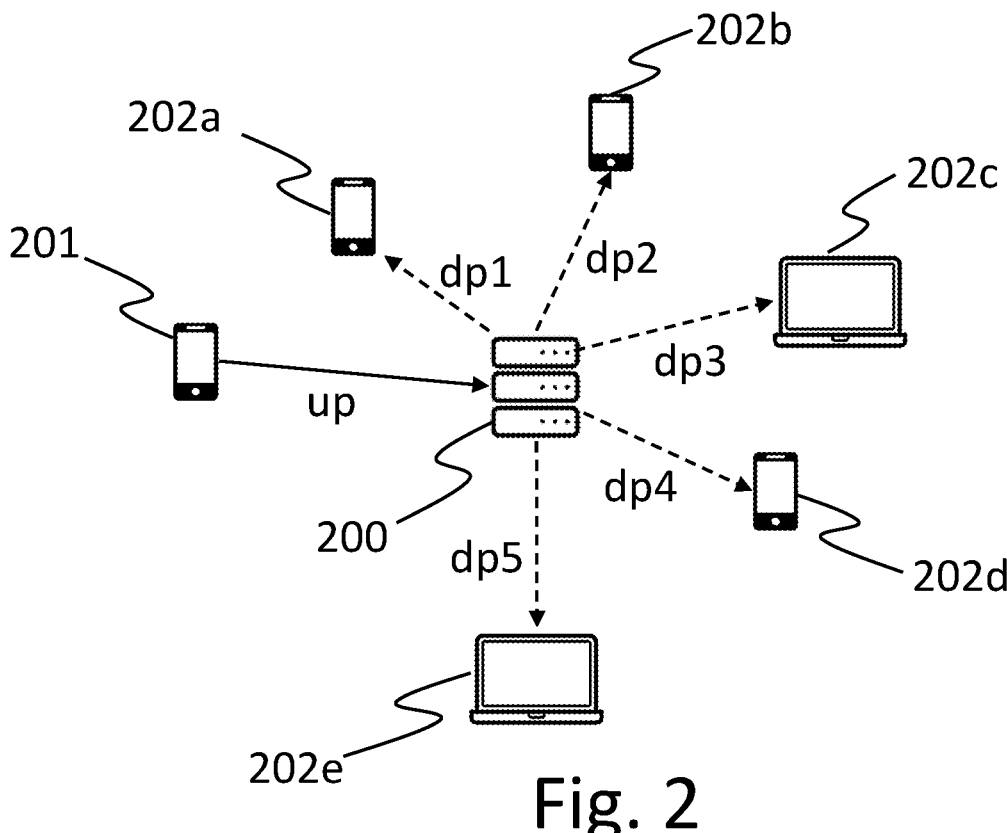
FIG. 2 shows schematically a second example of a system for sharing a symmetric cryptographic key between a group of communications devices.

One of the motivations for the modified mKEMs described above is to provide a CGKA protocol with improved bandwidth efficiency compared with existing protocols, in particular where the CGKA is required to be secure under post-quantum assumptions. Such a CGKA protocol is described hereafter with reference to a system as shown in FIG. 2 including an active server 200 and a group of communications devices 201, 202a-e. For the purposes of the present disclosure, it is assumed that the communications devices 201, 202a-e have already undergone a handshake phase, and therefore each hold cryptographic material necessary to enable group messaging.

Figure 3:
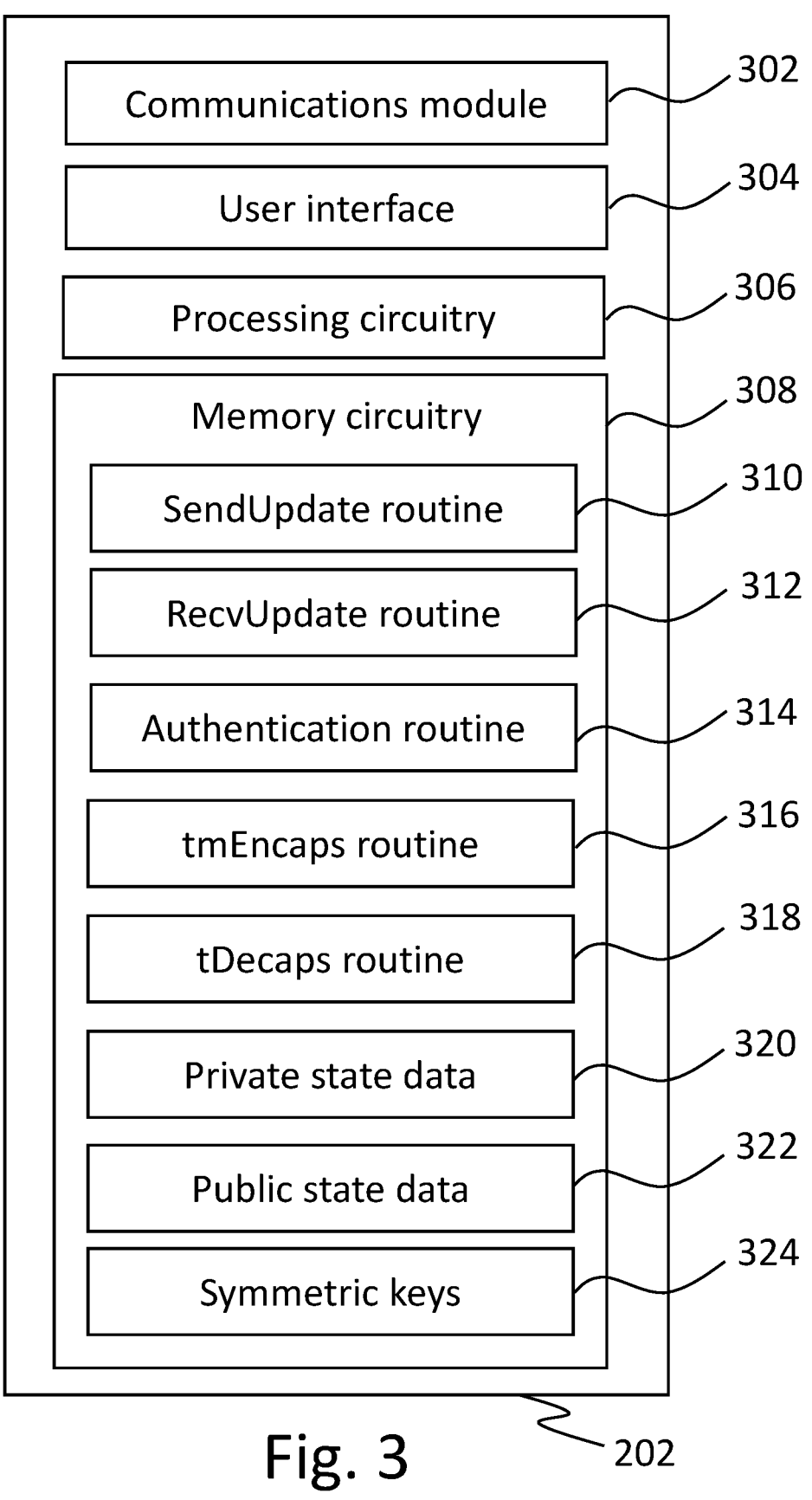
FIG. 3 shows schematically a communications device arranged in accordance with examples.

FIG. 3 shows schematically the communications device 201. It is noted that the communications devices 201, 202a-e are functionally identical with regard to the CGKA protocol, and references to "first communications device" and "second communications devices" are merely used to distinguish a device currently being used to send cryptographic material from devices currently receiving cryptographic material. The communications device 201 includes a communications module 302 for wired or wireless communication with the other communications devices in the group via the server 200. The communications module 302 may for example include one or more antennae for communications via a core network and a radio access network, in the case of a mobile communications device such as a smartphone. The communications device further includes a user interface 304 for receiving input from, and presenting information to, a user of the communications device 201. The user interface may include any input/output devices via which the user can compose messages to be transmitted to the group and view messages received from other communications devices in the group. The user interface may for example include a touch screen in the case of a smartphone.

The communications device 201 further includes processing circuitry 306 and memory circuitry 308. The processing circuitry 306 may include one or more processing units such as a central processing unit (CPU), specialist processing units such as a digital signal processor (DSP), a subscriber identity module (SIM), a hardware-integrated trusted execution environment (TEE), and/or one or more application-specific integrated circuits (ASICs) or application-specific standard products (ASSPs). The memory circuitry 308 may include volatile random-access memory (RAM), in particular static random-access memory (SRAM) and dynamic random-access memory (DRAM), along with non-volatile memory and storage such as flash memory, an integrated solid state drive (SSD), and integral hard disk drive (HDD), and/or one or more removable storage devices.

The memory circuitry 308 holds machine-readable instructions for implementing various functions described in the present disclosure. In particular, the memory circuitry 308 stores a SendUpdate routine 310 for providing updated cryptographic material to other communications devices in the group via the server 200, and a RecvUpdate routine 312 for receiving cryptographic material from other communications devices in the group via the server 200. The Send-Update routine 310 (described in more detail hereafter) includes a call to a tmEncaps routine 314 as described elsewhere in the present disclosure. The RecvUpdate routine 312 (also described in more detail hereafter) includes a call to a tDecaps routine 316 as described elsewhere in the present disclosure The memory circuitry 308 stores state data comprising cryptographic material for implementing the CGKA. The state data includes private state data 320, which is stored securely and is not intended to be shared with any other device, and public state data 322, which is also accessible to the other communications devices 202a-e in the group. The private state data 320 in this example includes a signature key $sk_i$ and an ephemeral decapsulation key $dk_i$. The public state data 322 includes a verification key $vk_i$ associated with the signature key $sk_i$, an ephemeral encapsulation key $ek_i$ associated with the decapsulation key $dk_i$, and also data associated with each of the second communications devices 202a-e including a respective verification key $vk_j$ and a respective encapsulation key $ek_j$. Finally, the memory circuitry stores a set if symmetric cryptographic keys 324 for enabling group messaging with the other communications devices in the group. In the present example, the symmetric cryptographic key 324 are processed sequentially, optionally with other data, to generate a messaging key for encrypting messages between the communications devices. This approach is used by an existing CGKA protocol referred to as Chained mKEM. In other examples, symmetric cryptographic keys exchanged using the protocols described herein may be used directly to encrypt messages between the communications devices.

Figure 4:
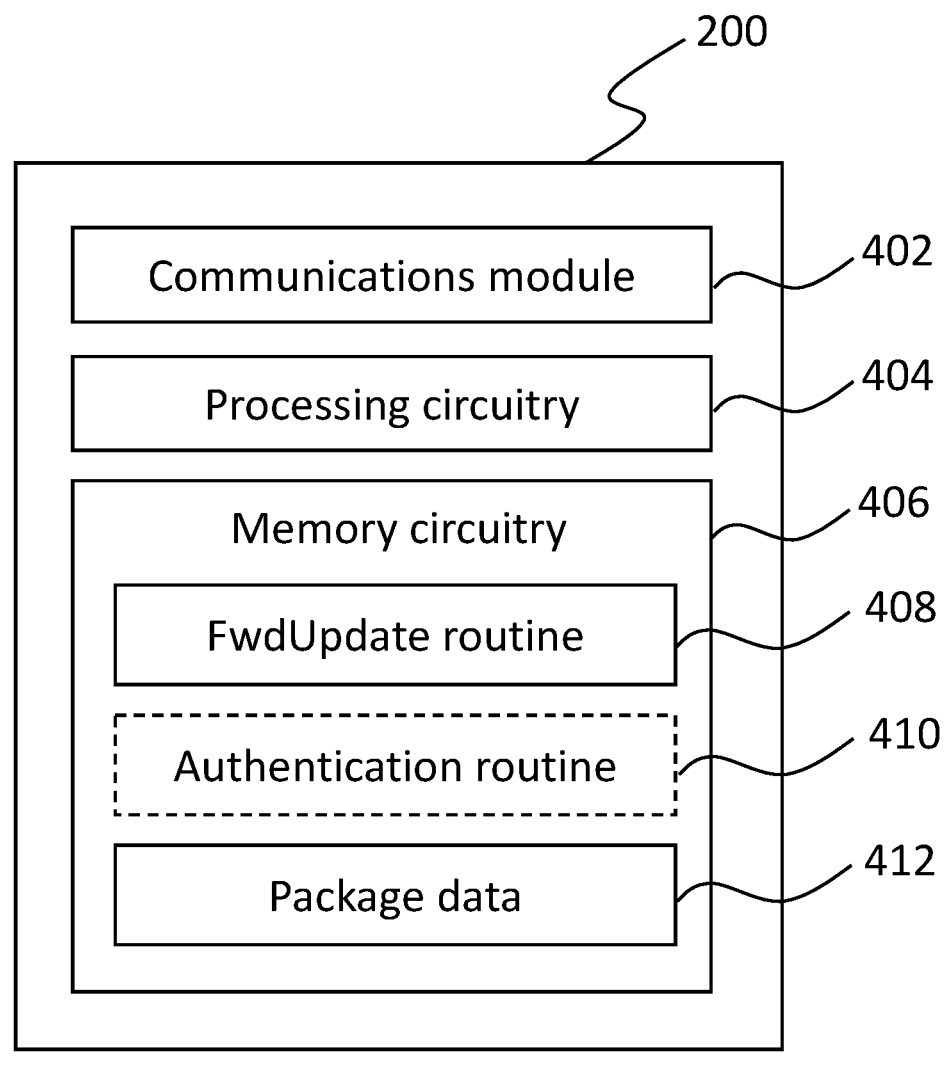
FIG. 4 shows schematically a server arranged in accordance with examples.

FIG. 4 shows schematically the server 200. The server 200 may be a single device or may be a distributed server system, for example arranged to provide a cloud-based service. The server 200 includes a communications module 402 for wired or wireless communication with the communications devices 201, 202a-e. The server 200 further includes processing circuitry 404 and memory circuitry 406. The memory circuitry 406 stores a FwdUpdate routine for processing upload packages received from one of the communications devices in the group to generate download packages for downloading by the other communication devices in the group. The memory circuitry 406 may optionally store an authentication routine for authenticating the upload packages. Finally, the memory circuitry 406 stores package data including the received upload packages and the generated download packages.

Figure 5:
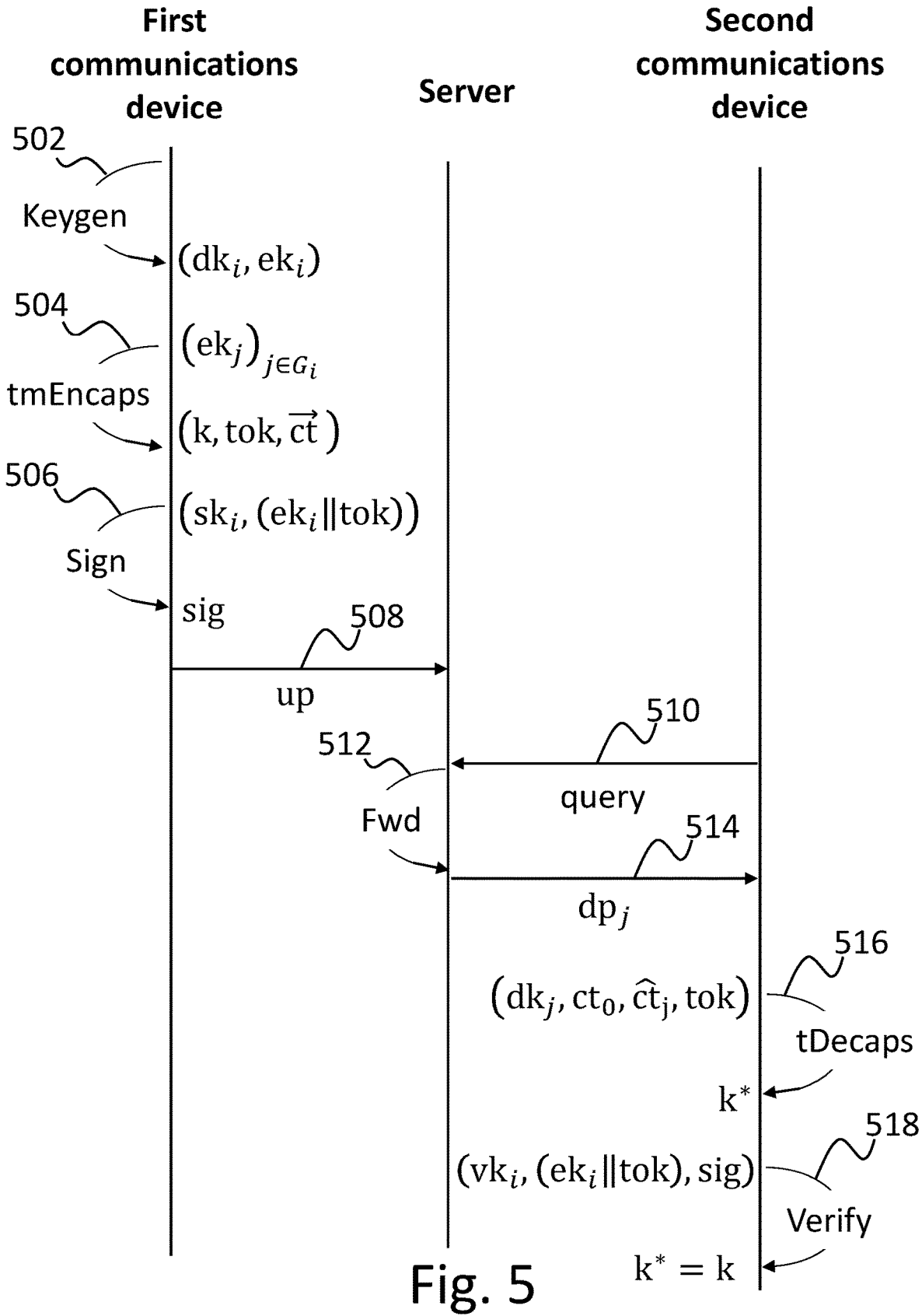
FIG. 5 shows an example of a method for sharing a symmetric cryptographic key between a group of communications devices.

FIG. 5 illustrates a method by which the first communications device 201 shares updated cryptographic material (namely an updated symmetric cryptographic key and updated encapsulation and decapsulation keys) with each of the second communications devices 202a-e in the group. The first communications device 201 may be arranged to share updated cryptographic material on a regular basis, and/or upon determining that the cryptographic material has been compromised. The first communications device generates, at 502, a new public-private keypair comprising an updated encapsulation key $ek_i$ and an associated updated decapsulation key $dk_i$. It is noted that in some examples, the first communications device may only update the symmetric cryptographic key, for example if it is determined that its decapsulation key has not been compromised, in which case step 502 can be omitted.

The first communications device 201 processes, at 504, the encapsulation keys $(ek_j)_{j \in G_i}$ of the second communications devices 202a-e (where $G_1$ refers to the set of second communications devices 202a-e), using the modified multi-recipient encapsulation function tmEncaps, to generate an updated symmetric key k, an authenticable token tok which is a cryptographic commitment of the updated symmetric key k, and a multi-recipient ciphertext $\vec{ct}=(ct_0, \hat{ct}_j)_{j \in G_i})$ which is an encapsulation of the updated symmetric key k under the encapsulation keys $(ek_i)_{j \in G_i}$. It is noted that, whilst in FIG. 5 the token is shown as being distinct from the ciphertext $\vec{ct}$ and the signature sig, in some examples the token may be the common portion $ct_0$ of the ciphertext, and in other examples the token may be a signature of data derived from the symmetric key k, as explained above.

In the present example, the token is authenticable by means of a signature scheme. The first communications device 202 therefore signs, at 506, data derived from the token using the signature key $sk_i$, to generate a digital signature sig. In this example, the data derived from the token is a concatenation of the token and the updated encapsulation key $ek_i$. By making the signed data further depend on the encapsulation key $ek_i$, there is no need to generate and transmit a further signature for the updated encapsulation key, as verification of the signature will authenticate both the token and the updated encapsulation key. Making the signed data further depend on the encapsulation key $ek_i$ therefore improves the computational- and bandwidth-efficiency of the CGKA protocol. The signed data may further be dependent on contextual data such as a description of the group G and/or an epoch number, for example by concatenating the contextual data with the token and the encapsulation key before signing. In this way, a single signature can be used to authenticate other data which may be relevant to the receiving devices.

The first communications device 201 generates an upload package up comprising the updated encapsulation key $ek_i$, the ciphertext $\vec{ct}$, the token tok, and the signature sig, and uploads, at 508, the package to the server 200. Because the same token and therefore the same signature will be provided to each of the second communications devices, the bandwidth cost of the upload is reduced compared with the alternative in which each portion of the ciphertext is signed separately, resulting in N−1 signatures, where N is the number of devices in the group G. The provision of the token thereby improves the scalability of the CGKA protocol. As will be explained in more detail hereinafter, this improvement makes the present protocol attractive even when compared with state-of-the art TreeKEM protocols, particularly when post-quantum security is required.

The SendUpdate algorithm, corresponding to steps 502-508 in FIG. 5, may be implemented using the pseudocode below:

| SendUpdate( ) |
| --- |
| Require: a group G = [N], a user i ∈ G |
| Ensure: A symmetric key k, an update package up issued by i |
| 1. $(ek_i, dk_i) \leftarrow$ Keygen( ) |
| 2. $G_i \leftarrow G\backslash\{i\}$ |
| 3. $(k, \vec{ct}, tok) \leftarrow$ tmEncaps $((ek_j)_{j \in G_i})$ |
| 4. sig $\leftarrow$ Sign$(sk_i, (ek_i \| tok))$ |
| 5. up = $(ek_i, \vec{ct}, tok, sig)$ |
| 6. return (k, up) |

In the present example, each time one of the communications devices generates and uploads an upload package to the server, a new "epoch" begins. Each epoch $t \in 1, 2, \ldots$ is therefore associated with a symmetric cryptographic key $k^{[t]}$. For a current epoch T, a messaging key for encrypting and decrypting messages between the communications devices is generated by sequentially processing the symmetric keys $k^{[t]}$ generated during all of the epochs $t=1, \ldots, T$, optionally with other data, using a key generation function. When one of the communications devices connects to the server 200 after having been offline for some time, the device therefore needs to obtain the symmetric keys $k^{[t]}$ for the epochs $t=T_0, \ldots, T$ since the device was last online.

Having received the upload package up from the first communications device (and possibly having received upload packages from other communications devices in the group), the server 200 receives, at 510, a query from one of the second communications devices 202. The query indicates the identity of the second communications device 202 and may further indicate the epoch $T_0$ during which the second communications device 202 was most recently online. Alternatively, the epoch $T_0$ for each communications device in the group G may be stored at the server 200.

In response to receiving the query, the server 200 executes, at 512, the FwdUpdate routine based on the identity j of the second communications device 202, the epoch $T_0$ during which the second communications device 202 was last online, and the current epoch T. The FwdUpdate routine generates a download package $dp_j$ comprising all of the data necessary for the second communications device 202 to update the cryptographic material stored in its memory (namely, the set of symmetric cryptographic keys and any of the. The FwdUpdate routine may be implemented using the pseudocode below:

| FwdUpdate( ) |
| --- |
| Require: a group G = [N], a recipient j ∈ G, an epoch number $T_0$ |
| Ensure: A download package $dp_j$ |
| 1. get the current epoch number T |
| 2. $dp_j = \left(ek_i^{[t]}, ct_0^{[t]}, \hat{a}_j^{[t]}, tok^{[t]}, sig^{[t]}\right)_{T_0 \leq t \leq T}$ |
| 3. return $dp_j$ |

The second communications device 202 downloads, at 514, the download package $dp_j$ from the server 200. For each epoch $t=T_0, \ldots, T$, the second communications device 202 processes, at 516, the decapsulation key $dk_j$, the common portion of the ciphertext $$ct_0^{[t]}$$

(if present), the portion $\widehat{ct}_j^{[t]}$ of the ciphertext dependent on the encapsulation key $ek_j$, and the token $tok^{[t]}$, using the modified decapsulation function tDecaps, to generate a candidate copy $k^{[t]}*$ of the symmetric key $k^{[t]}$. As explained above, if the token is not consistent with the ciphertext, the function tDecaps will output an error. Assuming tDecaps does not output an error, the second communications device 202 verifies, at 518, the signature $sig^{[t]}$ using the concatenated data $(ek_i\|tok)$ and the public verification key $vk_i$ associated with the signature key $sk_i$. Once steps 516-518 have been performed for each epoch $t=T_0, \ldots, T$, the second communications device 202 has obtained copies of each of the symmetric keys needed to derive the messaging key and can therefore exchange group messages with the other devices in the group. The RecvUpdate algorithm, corresponding to steps 516-518 in FIG. 5, may be implemented using the pseudocode below:

---

RecvUpdate( )

Require: a group $G = [N]$, a recipient $j \in G$, a download package $dp_j$
Ensure: A set of symmetric keys $(k^{[t]})_{T_0 \le t \le T}$ 1.     parse $dp_j = \left(ek_i^{[t]}, ct_0^{[t]}, \widehat{a}_i^{[t]}, tok^{[t]}, sig^{[t]}\right)_{T_0 \le t \le T}$ 2.     for $T_0 < t < T$ do 3.        $k^{[t]} \leftarrow tDecaps\left(dk_j, \left(ct_0^{[t]}, \widehat{a}_i^{[t]}\right), tok^{[t]}\right)$ 4.        if Verify $\left(vk_i, \left(ek_i^{[t]}\|tok^{[t]}\right), sig^{[t]}\right)$ then 5.           set $ek_i^{[t]}$ as new encapsulation key of i 6.        else
7.           return $\perp$
8.        end if
9.     end for
10.    return $(k^{[t]})_{T_0 \le t \le T}$

---

As mentioned in the background section, the IEFT draft proposals for MLS focus largely on CGKAs which are variants of TreeKEM due to the logarithmic scaling of bandwidth costs for uploads which is assumed to improve bandwidth efficiency. However, under a realistic cost model, the protocols described in the present disclosure can in fact be more bandwidth efficient, particularly when the various cryptographic functions are implemented for post-quantum security. The bandwidth costs associated with post-quantum primitives are typically one or two orders of magnitude greater than those of their classical counterparts. By contrast, the computational costs associated with post-quantum primitives are comparable to their classical counterparts, or sometimes even lower. The bandwidth cost is expected to be a bottleneck when fitting post-quantum protocols into CGKAs. This is especially true for instant messaging applications, which are predominantly run on smartphones, for which data is transmitted over wireless networks. Such networks can be slow, energy-consuming and subject to data caps. Data sent from a user device to a server is referred as uploaded data, whereas data sent from the server to a user device is referred as downloaded data. There is evidence that the effective costs of uploading and downloading data are similar. In particular, it has been shown for a wide range of devices and radio access technologies, that for a given device and at a given transmission rate the energy cost of downloading and uploading data is comparable. Furthermore, most mobile plans impose a cap on the data consumption of their users, and do not differentiate uploaded data from downloaded data: with respect to this data cap, all mobile plans of which the inventors are aware simply compute the used data as the sum of downloaded data and uploaded data. For these reasons, it is considered that uploading and downloading data are comparably costly for end users. In addition, the methods described herein entail downloading significantly more data than uploading data, so that the downloaded data will end up being the bottleneck.

For a user that uploads an update package for the first time after T epochs. It can be shown that, on average, $T=N-1$, and therefore this can be taken as a typical value for T. The table below compares the bandwidth costs for different components of an upload package and a download package using the present CGKA (Unchained mKEM, UmKEM) with two existing CGKAs, namely Chained mKEM (CmKEM) and a variant of TreeKEM referred to as Insider Secure TreeKEM (ITreeKEM). For the present method UmKEM, it is assumed that the token adds zero bandwidth cost (for example, because the token is equal to $ct_0$ or is in the form of a signature such that no additional signature is required).

| | upload | | | | download | | | |
|---|---|---|---|---|---|---|---|---|
| | ek | $ct_0$ | $\widehat{ct}_i$ | sig | ek | $ct_0$ | $\widehat{ct}_i$ | sig |
| ITreeKEM | log(N) | log(N) | log(N) | 2 | <2N | Tlog(N) | Tlog(N) | 2T |
| CmKEM | 1 | 1 | N − 1 | N − 1 | T | T | T | T |
| UmKEM | 1 | 1 | N − 1 | 1 | T | T | T | T |

Clearly, the UmKEM outperforms CmKEM in terms of bandwidth efficiency by virtue of the reduced number of signatures required at upload. For a comparison between UmKEM and ITreeKEM, it is necessary to know the relative sizes of the various components of the upload and download packets. Under pre-quantum assumptions (for example using a KEM based on El Gamal and a signature scheme based on the Elliptic Curve Digital Signature Algorithm (ECDSA)), then $$|ek|=|ct_0|=\widehat{ct}_j \ |=|sig|/2=32 \text{ bytes}$$

for 128 bits of classical security. Under post-quantum assumptions, it is more typical that $\widehat{ct}_j \ |<<|ek|, |ct_0|, |sig|$. From the table above it can be seen that the only component of the upload package which scales better with ITreeKEM than with UmKEM is a $\widehat{ct}_j$ . Since this is significantly smaller than the other portions of the upload package, and since the bandwidth bottleneck is caused by the downloaded data not the uploaded data, under reasonable assumptions and for post-quantum constructions at least, UmKEM is in fact more bandwidth efficient than ITreeKEM. Examples of byte sizes of the various components are given below for various post-quantum constructions.

Using Kyber-512 for the mKEM and the Dilithium signature scheme: $(\widehat{ct}_j \ |, \ |ct_0|, \ |ek|, \ |sig|)=(128, 640, 800, 2420)$.

Using FrodoKEM-640 for the mKEM and the SPHINCS+ signature scheme: $(\widehat{ct}_j \ |, \ |ct_0|, \ |ek|, \ |sig|)=(120, 9600, 9600, 17088)$.

Using a trivial mKEM construction based on Classic McEliece and the Rainbow signature scheme: $(\widehat{ct}_j \ |, \ |ct_0|, \ |ek|, \ |sig|)=(128, 0, 261120, 66)$.

The above embodiments are to be understood as illustrative examples of the invention. Further embodiments of the invention are envisaged. For example, although the description above relates to mKEM schemes, in other contexts the same principles may be used to obtain a scalable mPKE scheme. In an mPKE, the aim is to securely send given data, rather than a randomly generated symmetric key, to a group of devices. Those skilled in the art will appreciate that any mKEM can be straightforwardly converted to an mPKE. For example, by encrypting data using the randomly generated symmetric key and sending the encrypted data along with the multi-recipient ciphertext, the mKEM with tokens as described herein is converted to an mPKE with tokens.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of sharing a symmetric cryptographic key between a first communications device and a plurality of second communications devices, wherein each of the second communications devices is associated with a respective public-private keypair in which a respective decapsulation key is held at the second communications device and a respective encapsulation key is accessible by the first communications device, the method comprising:

at the first communications device:
processing the encapsulation keys of the plurality of second communications devices using an encapsulation function to generate the symmetric cryptographic key, an authenticable token, and a ciphertext, wherein:
the token is a cryptographic commitment of the symmetric cryptographic key; and
the ciphertext is a multi-recipient encapsulation of the symmetric cryptographic key under the encapsulation keys of the plurality of second communications devices; and
transmitting, to each of the plurality of second communications devices, the token and a respective portion of the ciphertext depending on the respective encapsulation key of that second communications device; and
at each of the plurality of second communications devices:
processing the respective decapsulation key and the respective portion of the ciphertext using a decapsulation function associated with said encapsulation function, to generate a respective candidate copy of the symmetric cryptographic key; and
authenticating the token, whereby to determine that the respective candidate copy of the symmetric cryptographic key corresponds to the symmetric cryptographic key.

2. The method of claim 1, wherein the decapsulation function is arranged to output an error if the token is not consistent with the received portion of the ciphertext.

3. The method of claim 1, wherein:
the generated ciphertext further comprises a common portion independent of the encapsulation keys of any of the plurality of second communications devices; and
the token is said common portion of the generated ciphertext.

4. The method of claim 1, further comprising, at the first communications device:
processing data derived from the token using a secret key to generate authentication data for use in authenticating the token; and
transmitting said authentication data to each of the plurality of second communications devices,
wherein said authenticating of the token uses the authentication data.

5. The method of claim 4, wherein:
the secret key is a signature key;
the authentication data is a digital signature; and
authenticating the token comprises verifying the digital signature using a public verification key associated with the signature key.

6. The method of claim 5, wherein the digital signal is generated using any one of the CRYSTALS-DILITHIUM, FALCON, SPHINCS+, or Rainbow signature schemes.

7. The method of claim 4, further comprising, at the first device:
generating a first public-private keypair comprising a first decapsulation key and an associated first encapsulation key; and
providing the first encapsulation key to each of the plurality of second communications devices,
wherein the data derived from the token is dependent on the first encapsulation key.

8. The method of claim 1, wherein the encapsulation function and the decapsulation function are instantiated using supersingular isogeny key encapsulation (SIKE) or the Lindner-Peikert framework.

9. The method of claim 1, wherein said transmitting comprises:

uploading the token and the ciphertext from the first communications device to a server; and downloading the token and the respective portion of the ciphertext to each second communications device from the server.

10. The method of claim 1, further comprising:

at the first communications device:

encrypting data using the generated symmetric cryptographic key; and transmitting the encrypted data to each of the plurality of communications devices; and at each of the plurality of second communications devices:

decrypting the encrypted data using the respective candidate copy of the symmetric cryptographic key.

11. A system comprising:

a server comprising at least one processor and at least one memory, wherein the at least one memory comprises instructions which, when executed by the at least one processor, cause the at least one processor to carry out operations comprising:

receiving, from a first communications device:

a token;

authentication data for authenticating the token; and a ciphertext comprising respective portions for transmitting to each of a plurality of second communications devices; and transmitting, to each of the plurality of second communications devices, data comprising:

the token;

the authentication data; and the respective portion of the ciphertext depending on the respective encapsulation key for that second communications device.

12. The system of claim 11, wherein:

the operations further comprise authenticating the token using the authentication data; and transmitting said data is dependent on the authentication of the token.

13. The system of claim 11, further comprising the first communications device and the plurality of second communications devices, wherein:

each of the second communications devices is associated with a respective public-private keypair in which a respective decapsulation key is held at the second communications device and a respective encapsulation key is accessible by the first communications device; and the first communications device is arranged to:

process the encapsulation keys of the plurality of second communications devices using an encapsulation function to generate the symmetric cryptographic key, an authenticable token, and a ciphertext, wherein:

the token is a cryptographic commitment of the symmetric cryptographic key; and the ciphertext is a multi-recipient encapsulation of the symmetric cryptographic key under the encapsulation keys of the plurality of second communications devices; and upload the token and the ciphertext to the server.

14. The system of claim 13, wherein each of the plurality of second communications devices is arranged to:

download the token and a respective portion of the ciphertext depending on the respective encapsulation key of that second communications device, from the server;

process the respective decapsulation key and the respective portion of the ciphertext using a decapsulation function associated with said encapsulation function, to generate a respective candidate copy of the symmetric cryptographic key; and authenticate the token, whereby to determine that the respective candidate copy of the symmetric cryptographic key corresponds to the symmetric cryptographic key.

15. The system of claim 14, wherein the decapsulation function is arranged to output an error if the respective portion of the ciphertext is inconsistent with the token.

16. The system of claim 14, wherein:

the ciphertext further comprises a common portion independent of the encapsulation keys of any of the plurality of second communications devices; and the token is said common portion of the ciphertext.

17. The system of claim 14, wherein the first communications device is further arranged to:

process data derived from the token using a secret key to generate authentication data for use in authenticating the token; and transmit said authentication data to each of the plurality of second communications devices, wherein said authenticating of the token uses the authentication data.

18. The system of claim 17, wherein each of the plurality of second communications devices holds a respective prior cryptographic key, and is arranged to process the respective candidate copy of the symmetric cryptographic key and the respective prior symmetric cryptographic key using a key generation function to generate an updated symmetric cryptographic key.

19. The system of claim 14, wherein:

each of the plurality of second communications devices is arranged to query the server for data associated with the other communications devices of the plurality of communications devices; and said downloading is dependent on said querying.

20. A first communications device comprising one or more processors, the first communications device arranged to:

receive a respective encapsulation key associated with each of a plurality of second communications devices;

generate a first public-private keypair comprising an ephemeral first decapsulation key and an associated ephemeral first encapsulation key;

process the respective encapsulation keys associated with the plurality of second communications devices using an encapsulation function to generate a first symmetric cryptographic key, a first token, and a first ciphertext, wherein:

the first token is a cryptographic commitment of the first symmetric cryptographic key; and the first ciphertext is a multi-recipient encapsulation of the first symmetric cryptographic key under the encapsulation keys of the plurality of second communications devices;

sign first data derived from the token and the first encapsulation key to generate a first digital signature;

upload the first token, the first digital signature, the first encapsulation key, and the first ciphertext to a server;

download, from the server, second data associated with one of the plurality of second communications devices, the second data comprising:

a second token;

a second digital signature;

an ephemeral second encapsulation key; and a portion of a second ciphertext, wherein said second ciphertext is a multi-recipient encapsulation of the second symmetric cryptographic key under a plurality of encapsulation keys including the first encapsulation key; and process the first decapsulation key and the portion of the second ciphertext, using a decapsulation function associated with the encapsulation function, to generate a candidate copy of a second symmetric cryptographic key stored by said one of the plurality of second communications devices; and authenticate the second token and the second encapsulation key by verifying the second digital signature using a public verification key associated with the second signature key and data derived from the second token and the second encapsulation key, whereby to determine that the candidate copy of the second symmetric cryptographic key corresponds to the second symmetric cryptographic key stored by said one of the plurality of second communications devices.

\* \* \* \* \*